July 31, 1956
A. C. HARTLEY
2,756,872
APPARATUS FOR HOLDING, BRAKING OR WINDING
CABLES, HAWSERS, THREADS OR THE LIKE
Filed March 29, 1954
2 Sheets-Sheet 2
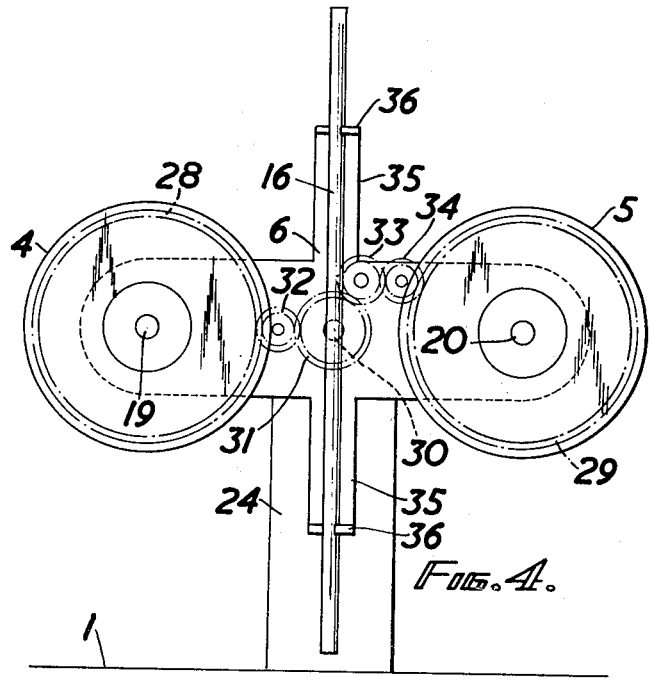
FIG. 4.
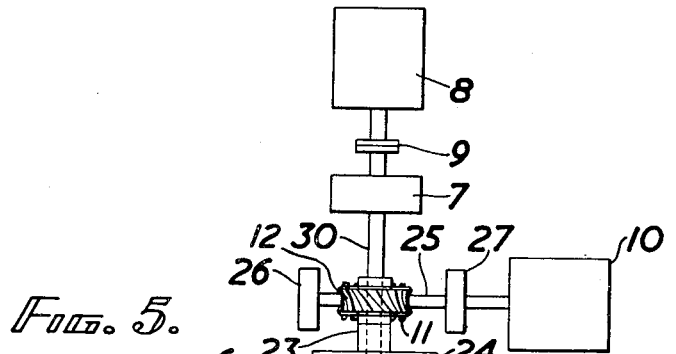
FIG. 5.
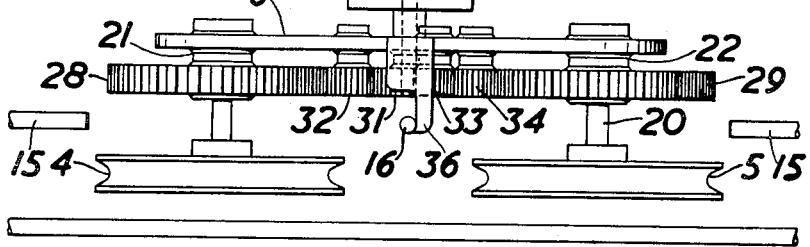
INVENTOR
A. C. Hartley
BY John A. Seifert
ATTORNEY

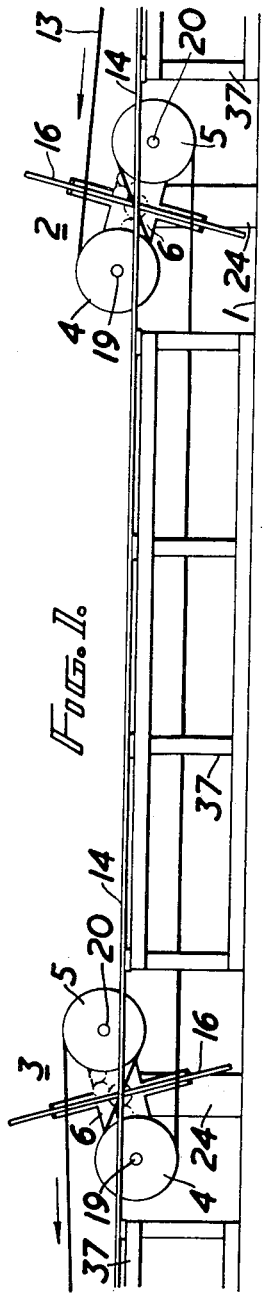
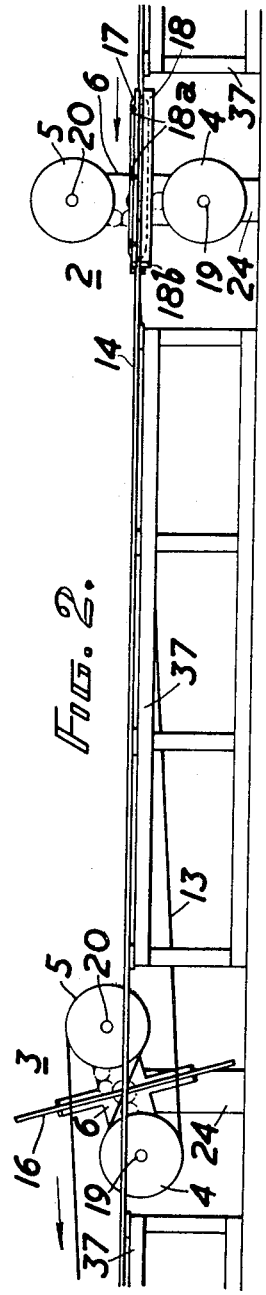
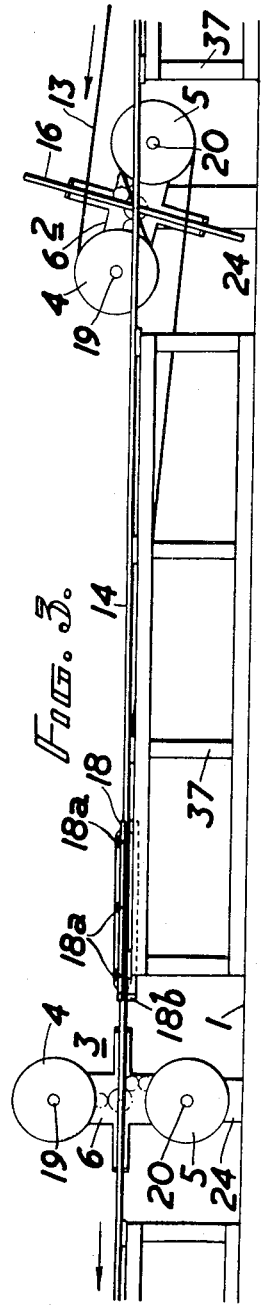

United States Patent Office 2,756,872
Patented July 31, 1956

2,756,872

APPARATUS FOR HOLDING, BRAKING OR WINDING CABLES, HAWSERS, THREADS OR THE LIKE

Arthur Clifford Hartley, West Byfleet, England, assignor to Johnson & Phillips Limited, London, England Application March 29, 1954, Serial No. 419,467

Claims priority, application Great Britain April 1, 1953

9 Claims. (Cl. 203—40)

This invention relates to apparatus for holding, braking, winding or paying out cables, hawsers, threads or the like, and has particular though not exclusive reference to apparatus for holding, braking, winding or paying out cables from cable-laying ships.

The object of the invention is the provision of improvements in such apparatus, and the invention consists broadly of a winch for controlling the longitudinal movement of cables, threads or like flexible leads, comprising two or more pulleys rotatably mounted in a common plane on a common carrier, means for rotating said carrier in a plane parallel to that of said pulleys, from a non-operative position, at which the flexible lead may pass freely between said pulleys in the plane thereof, to an operative position at which said lead is taken up by said pulleys and makes a part turn round both of them, and for rotating said carrier back from said operative position to said non-operative position, and means for rotating said pulleys or braking the rotation thereof, so that, when said carrier is at said operative position, said flexible lead can be wound along by said pulleys or permitted to move longitudinally under a braking drag exercised by said pulleys.

In order that the invention may be the more clearly understood, an apparatus in accordance therewith, for holding, braking, winding and paying out, from a cable-laying ship, submarine cables having solid repeaters connected at intervals therealong, will now be described, reference being made to the accompanying drawings wherein:

Figure 1 is a side elevation of the apparatus shown at the normal position at which the cable is being paid out;

Figure 2 is a similar view shown at the position at which a repeater in the line of the cable is just commencing to pass the apparatus;

Figure 3 is a similar view, shown at the position at which the repeater is about to finish passing the apparatus;

Figure 4 is an elevation to a larger scale than Figures 1–3 of one of the winches comprised in the apparatus;

Figure 5 is a plan of said winch shown in Figure 4.

Referring to the drawings, the apparatus comprises two winches spaced apart longitudinally on the deck 1 of the ship, viz. a forward winch 2 and an aft winch 3. Each of these winches comprises two sheaves 4 and 5 rotatably mounted on a common carrier 6, said sheaves being in a common vertical plane which is longitudinal of the ship. The carrier 6 is also rotatable about an axis parallel to, and midway between the axes of the sheaves.

As will be more particularly described, the sheaves 4 and 5 are geared together so that their rotation on their own axes must be in opposite directions. Such rotation can be either variably braked by means of a hydraulic brake 7 (Figure 5), or effected positively by means of a prime mover 8, the arrangement being such that, when said hydraulic brake is operative, said prime mover is uncoupled from said sheaves by means of a clutch 9, and when said prime mover is operative, it is coupled to said sheaves by means of said clutch, and said hydraulic brake is actuated to the non-braking state.

The rotation of the carrier 6 about the axis between the sheaves is effected, as will be hereinafter more particularly described, by means of a prime mover 10 through the medium of a worm 11 and worm wheel 12, the pitch of the worm and the worm wheel teeth being such that drive cannot take place from the worm wheel to the worm.

The sheaves of the two winches 2 and 3 are arranged in the same vertical plane, and, during normal paying out operation of the cable 13, the arrangement is as illustrated in Figure 1, the carrier 6 of the forward winch 2 being turned to the position at which the sleeve 4 is to the aft of, and at a level a little above, the sheave 5, and the carrier 6 of the aft winch 3 being turned to the position at which the sheave 4 is to the aft of and at a level a little below the sheave 5. The cable 13 passes aftwards from the hold of the ship, over the top of the sheave 4 of the winch 2, then makes a turn of more than two right angles round said sheave 4, then passes forwards and upwards over the top of the sheave 5 of said winch 2, then makes a turn of more than two right angles round said sheave 5, then passes horizontally aftwards and underneath the sheave 4 of the winch 3, then makes a turn of more than two right angles round said sheave 4, then passes forwardly and downwardly underneath the sheave 5 of said winch 3, then makes a turn of more than two right angles round said sheave 5, and then continues rearwardly and passes over the stern of the ship into the sea.

During this normal paying out operation, the tension of the cable between the ship and the bottom of the sea serves to draw the cable aftwards, and the function of the two winches is to control the rate of paying out. The two winches are therefore disconnected from their prime movers 8 by means of their clutches 9, and the hydraulic brakes 7 are set for the appropriate degree of braking.

A track consisting of two parallel rails 14 and 15 extends aftwards from the region of the ship's hold towards the stern of the ship. These rails 14 and 15 are at the same level at the axes about which the carriers 6 rotate and said rails are spaced equally one on each side of the plane of the sheaves 4 and 5, the rail 15 being between said plane and the carrier 6, and the rail 14 being on the other side of said plane. The rail 14 extends continuously aftwards to the stern of the ship, but the rail 15, as shown in Figure 5, has a gap in it where its line passes between the carrier 6 of each winch and the sheaves 4 and 5. The carrier 6 of each winch has, mounted in rigid relation therewith, a rail portion 16, which is in the same vertical plane as the rail 15 and intersects the axis about which said carrier rotates, at right angles to the plane containing the axes of the sheaves. The length of this rail portion 16 is equal to the length of the gap in the rail 15.

When one of the repeaters 17 (which are connected in the cable at intervals of, say, fifty miles) leaves the ship's hold, it is loaded by suitable tackle on to a cradle 18 having wheels 18a whereby it runs on the rails 14 and 15, and, as the cable continues to be paid out, said repeater in its cradle approaches the forward winch 2. When said repeater is close to said forward winch, the aft winch is fully braked by its hydraulic brake 7, and the paying out is thereby brought to a standstill.

The prime mover 10 of the forward winch 2 is then operated to rotate the carrier 6 in a clockwise direction (according to the drawings) through nearly three right angles until the sheave 4 is vertically under the sheave 5 as shown in Figure 2. During this operation the cable will become completely unwound from both sheaves and will extend straight through between the two sheaves, and, at the end of said operation, the cable will be held solely by the after winch 3. Moreover, at the end of said operation the rail portion 16 will be located in the gap in the rail 15 so that the track as a whole, consisting of both rails 14 and 15 will run straight through between the two sheaves 4 and 5 of the winch 2.

The brake 7 of the after winch 3 is now released sufficiently to enable said after winch to pay the cable out slowly, so that the repeater 17 in its cradle 18 moves along the track between the sheaves 4 and 5 of the forward winch 2, as shown in Figure 2, until it reaches the portion of the track between the two winches. The after winch 3 is then again fully braked, thereby again bringing the paying out to rest, and the prime mover 10 of the forward winch is operated to rotate the carrier 6 in the counterclockwise direction back to the position of Figure 1, the cable 13 being thereby again taken up by the sheaves of said forward winch as in Figure 1.

The hydraulic brake 7 of said forward winch is now fully braked and the prime mover 10 of the after winch 3 is operated to rotate the carrier 6 in a counterclockwise direction until the sheave 5 is vertically beneath the sheave 4, as shown in Figure 3, and the rail portion 16 of said after winch 3 occupies the gap in the rail 15 thereby completing the track past said after winch 3. The position is now as in Figure 3.

The brake 7 of the forward winch 2 is now released sufficiently to pay the cable out until the repeater 17 in its cradle 18 has passed between the sheaves of the after winch 3 and occupies a position well to the aft of said after winch. The brake 7 of the forward winch 2 is then again actuated to stop the paying out, and the prime mover 10 of the after winch 3 is operated to rotate the carrier 6 of said after winch clockwise until the position of Figure 1 is again reached. The situation now is that the cable is wound on both winches as in Figure 1, and the repeater is to the aft of both winches.

The paying out is now continued by both winches until the repeater and cradle have reached a given position. The cradle is then positively stopped by means of some form of stop. For preventing movement of the repeater 17 to the aft relative to the cradle 18, the latter is provided with a hinged stopper plate 18b at its after end, which may be similar to the hinged stopper plate of the cradle described in prior copending application Serial No. 331,035 filed January 13, 1953, in the name of George Thomas William Whitehead, cognate with application Serial No. 346,903 filed April 6, 1953, in the name of David Graham. When the cradle is stopped as just described, this hinged stopper plate is swung open, and the cable is then again paid out by the two winches so that the repeater leaves the cradle and is passed aftwards over the ship's stern into the sea. This last operation can be effected in the same way as in the prior copending applications aforesaid.

The cradle may then be returned to the region of the ship's hold, and the paying out is continued uninterruptedly until another repeater has to be dealt with.

It will be clear that, when the carrier 6 of the winch 3 is being rotated from the position of Figure 3 back to the position of Figure 1, said winch is drawing in a certain length of the cable forwardly over the ship's stern in opposition to the tension of said cable. It is therefore necessary that the transmission between the prime mover 10 and said carrier shall provide a high mechanical advantage.

The prime mover 8 is usually required to be operative only during the starting and finishing of a cable laying operation, when, as will be understood by those skilled in the art, a certain amount of manipulation is necessary involving the drawing in, and the positive paying out of the cable.

Describing now some of the constructional details of the apparatus, the common carrier 6 of each winch consists of a plate in a plane parallel to that of the sheaves 4 and 5. Said sheaves 4 and 5 are fast on respective spindles 19 and 20 which rotate in bearings 21 and 22, carried by said carrier 6. To enable said carrier 6 to be rotated about the axes between the sheaves 4 and 5, a hollow shaft 23 is provided, projecting fast from said carrier on the side opposite to said sheaves, which hollow shaft rotates in a fixed bearing member 24 mounted on the ship's deck. This hollow shaft 23 has fast on it the aforesaid worm wheel 12, and the prime mover 10, which is suitably mounted on the ship's deck, has the aforesaid worm 11 mounted fast on its spindle 25. The references 26 and 27 designate bearing members for said spindle 25, which are suitably supported from the ship's deck. Thus drive takes place from the shaft 25 of the prime mover 10, through the worm 11 and worm wheel 12 to the shaft 23 and thence to the carrier 6.

For gearing the sheaves 4 and 5 together as aforesaid, said sheaves have two gear wheels 28 and 29 mounted fast on their spindles 19 and 20 between said sheaves and the carrier 6. A shaft 30 passes coaxially through the hollow shaft 23 and has a pinion 31 mounted on its end in the plane of the gear wheels 28 and 29. Said pinion 31 is coupled to the gear wheel 28 by means of a pinion 32 rotatably mounted on the carrier 6 and in mesh both with said pinion 31 and said gear wheel 28, and said pinion 31 is also coupled to the gear wheel 29 by means of two equal pinions 33 and 34 rotatably mounted on said carrier 6 and in mesh with each other, said pinion 33 being in mesh with said pinion 31 and said pinion 34 with said gear wheel 29. Thus the gear wheels 28 and 29, and therefore the sheaves 4 and 5, are geared together to rotate in opposite directions as aforesaid.

Said hydraulic brake 7, which is suitably supported from the ship's deck, acts direct on said shaft 30 and is accordingly capable of braking the sheaves 4 and 5 as before stated. The prime mover 8, which is also mounted on the ship's deck is capable of being clutched to said shaft 30 by means of the clutch 9, and is thus capable of driving said sheaves 4 and 5.

For mounting said rail portion 16 on the carrier 6, the latter is formed with two arms 35 integral therewith, whose ends are bent over at 36 and secured to said rail portion, say by welding, as clearly shown in Figures 4 and 5.

The reference numeral 37 designates supporting structure for the track rails 14 and 15.

I claim:

1. A device for controlling the longitudinal movement of a flexible lead, at an intermediate point of the path thereof, comprising two pulleys, a common carrier rotatable on a fixed axis and on which carrier said pulleys are rotatably mounted in a common plane, means for rotating said carrier from a non-operative position, at which said lead may pass freely between said pulleys, to an operative position at which said lead is taken up by said pulleys and makes a part turn round both of them, and from said operative position to said non-operative position, and means for controlling the rotation of at least one of said pulleys.

2. A device for controlling the longitudinal movement of a flexible lead, at an intermediate point of the path thereof, comprising two pulleys, a common carrier rotatable on a fixed axis and on which carrier said pulleys are rotatably mounted in a common plane, means for rotating said carrier from a non-operative position, at which said lead may pass freely between said pulleys, to an operative position at which said lead is taken up by said pulleys and makes a part turn of more than two right angles round both of them, and from said operative position to said non-operative position, and means for controlling the rotation of at least one of said pulleys.

3. A device for controlling the longitudinal movement of a flexible lead, at an intermediate point of the path thereof, comprising two pulleys, a common carrier rotatable on a fixed axis and on which carrier said pulleys are rotatably mounted in a common plane, means for rotating said carrier from a non-operative position, at which said lead may pass freely between said pulleys, to an operative position at which said lead is taken up by said pulleys and makes a part turn round both of them, and from said operative position to said non-operative position, means gearing said pulleys together to rotate in opposite directions, and means for controlling the rotation of said pulleys.

4. A device for controlling the longitudinal movement of a flexible lead, at an intermediate point of the path thereof, comprising two pulleys, a common carrier rotatable on a fixed axis, said pulleys are rotatably mounted on the carrier in a common plane on axes parallel to and on opposite sides of the axis of rotation of the carrier, means for rotating said carrier from a non-operative position, at which said lead may pass freely between said pulleys, to an operative position, at which said lead is taken up by said pulleys and makes a part turn round both of them, and from said operative position to said non-operative position, and means for controlling the rotation of at least one of said pulleys.

5. A device for controlling the longitudinal movement of a flexible lead, at an intermediate point of the path thereof, comprising two pulleys, a common carrier on which said pulleys are rotatably mounted in a common plane, a hollow shaft fast with said common carrier, parallel to and between the axes of said pulleys, fixed bearings in which said hollow shaft rotates, a second shaft passing through said hollow shaft, means gearing said second shaft to said pulleys whereby rotation of said second shaft effects rotation of said pulleys in opposite directions, means for rotating said hollow shaft and thereby rotating said common carrier, from a non-operative position, at which said lead may pass freely between said pulleys, to an operative position, at which said lead is taken up by said pulleys and makes a part turn round both of them and from said operative position to said non-operative position, and means for controlling the rotation of said second shaft and thereby said pulleys.

6. A device for controlling the longitudinal movement of a flexible lead, at an intermediate point of the path thereof, comprising two pulleys, a common carrier rotatable on a fixed axis and on which carrier said pulleys are rotatably mounted in a common plane, means for rotating said carrier from a non-operative position, at which said lead may pass freely between said pulleys, to an operative position at which said lead is taken up by said pulleys and makes a part turn round both of them and from said operative position to said non-operative position, a source of power for rotating at least one of said pulleys, and a brake for braking at least one of said pulleys.

7. A device for paying out a submarine cable from a cable-laying ship into the sea, which cable has a solid repeater connected in the line thereof, comprising two pulleys, a common carrier rotatable on a fixed axis and on which carrier said pulleys are rotatably mounted in a common plane, means for rotating said carrier from a non-operative position at which said lead, together with said repeater, may pass freely between said pulleys, to an operative position at which said lead is taken up by said pulleys and makes a part turn round both of them, and from said operative position to said non-operative position, means for controlling the rotation of at least one of said pulleys, a track, and a cradle adapted to run on said track while carrying said repeater as the latter approaches said pulleys and passes between them, a part of said track being carried by said common carrier and being brought into operative position in the line of the track only when said common carrier is rotated to the non-operative position of the carrier.

8. A device according to claim 7, together with a second and similar device, said two devices being spaced along the deck of the cable-laying ship, whereby the pulleys of one device can be actuated to the non-operative position for giving passageway to the repeater, while the pulleys of the other device are at the operative position, and vice versa.

9. A device accordingly to claim 7, wherein the axis of rotation of the carrier is in the plane of the track.

References Cited in the file of this patent

FOREIGN PATENTS

| | | |
|---|---|---|
| 448,630 | France | Sept. 24, 1912 |
| 636,595 | Germany | Oct. 12, 1936 |
| 723,811 | Germany | Aug. 11, 1942 |